(12) United States Patent
Ohizumi et al.

(10) Patent No.: US 6,979,115 B2
(45) Date of Patent: Dec. 27, 2005

(54) SURFACE EMITTING DEVICE AND LIQUID CRYSTAL DISPLAY

(75) Inventors: Mitsuo Ohizumi, Fukushima-ken (JP); Takuro Sugiura, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 123 days.

(21) Appl. No.: 10/611,567

(22) Filed: Jul. 1, 2003

(65) Prior Publication Data
US 2004/0021806 A1    Feb. 5, 2004

(30) Foreign Application Priority Data
Jul. 5, 2002    (JP) .............................. 2002-197991

(51) Int. Cl.[7] .............................................. F21V 7/04
(52) U.S. Cl. ....................... 362/634; 362/632; 362/633
(58) Field of Search .............................. 362/31, 27, 26, 362/634, 632, 633, 396, 600, 608, 609, 610, 362/601, 613, 382, 486, 438

(56) References Cited

U.S. PATENT DOCUMENTS

| 5,497,293 A | * | 3/1996 | Noguchi et al. ............ 362/609 |
| 6,104,453 A | | 8/2000 | Watanabe ..................... 349/61 |
| 6,309,081 B1 | * | 10/2001 | Furihata ...................... 362/634 |
| 6,443,584 B2 | * | 9/2002 | Suzuki et al. ................ 362/633 |
| 6,536,932 B1 | * | 3/2003 | Suzuki et al. ................ 362/560 |
| 6,561,662 B2 | * | 5/2003 | Egawa ......................... 362/27 |
| 6,692,134 B2 | * | 2/2004 | Ohwada et al. ............... 362/31 |
| 6,715,896 B2 | * | 4/2004 | Kawashima et al. ........ 362/613 |

* cited by examiner

Primary Examiner—John Anthony Ward
Assistant Examiner—Bao Q. Truong
(74) Attorney, Agent, or Firm—Brinks Hofer Gilson & Lione (57) ABSTRACT

The invention includes a bar-shaped light source and a light guiding plate for entering a light of the light source from the lateral end surface and emitting the light from the emissive surface, wherein a cover having the bracket shaped cross sectional shape for covering the bar-shaped light source and one portion of the light guiding plate supports the light source at the lateral side portion of the light guiding plate, the bracket-shaped cover made of a spring material in a shape of clip pinches the light guiding plate through a pressing portion on the inner surface of the cover, and the projections extended on the both sides of the cover are adopted to position the light guiding plate accurately in the width direction.

21 Claims, 6 Drawing Sheets

SURFACE EMITTING DEVICE AND LIQUID CRYSTAL DISPLAY

This application claims the benefit of priority to Japanese Patent Application 2002-197991, filed on Sep. 5, 2002.

BACKGROUND OF THE INVENTION

1. Field of the Invention

The present invention relates to a surface emitting device and a liquid crystal display.

2. Description of the Related Art

Figure 10:
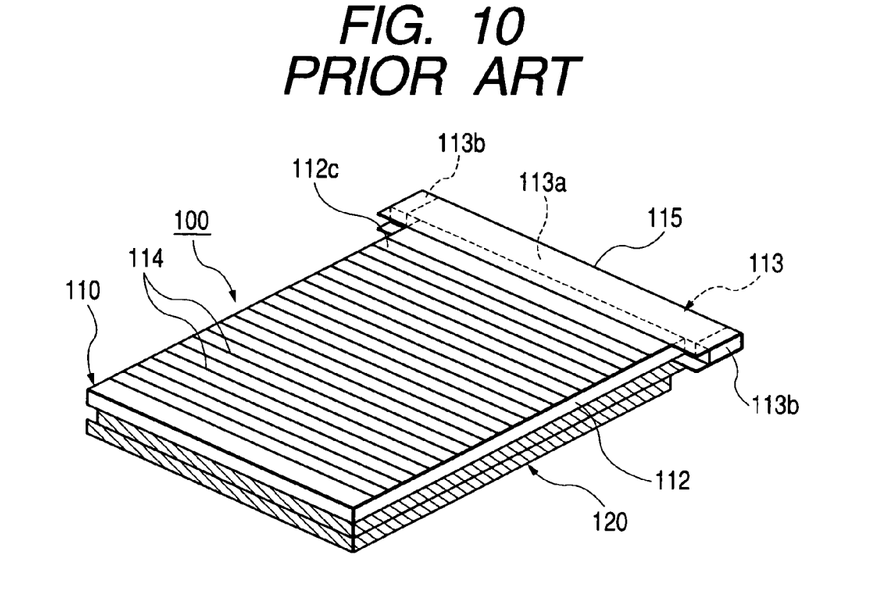
FIG. 10 is a perspective view showing one example of the conventional front light.

Hitherto, in a reflective liquid crystal display that uses the surrounding light as light source, since the brightness depends on the amount of the surrounding light, the visibility of the display is extremely deteriorated in an environment where it is impossible to obtain enough surrounding light, such as use in a dark place. In response, a proposed liquid crystal display has a front light (surface emitting device) in front of the reflective liquid crystal display unit (liquid crystal display element) as an auxiliary light source. The liquid crystal display having this front light operates as an ordinary reflective liquid crystal display where enough surrounding light is obtained, like in the open air during daytime, and if necessary, it operates with the front light turned on as the light source. Thus, one example of the liquid crystal display with the front light arranged in front of the liquid crystal display unit is shown in FIG. 10. The liquid crystal display 100 shown in FIG. 10 comprises a liquid crystal display unit 120 and a front light 110, and the front light 110 is arranged in front of the liquid crystal display unit 120 (top surface of FIG. 10) so that a light guiding plate 112 can be positioned in a display area of the liquid crystal display unit 120.

The front light 110 comprises the flat light guiding plate 112 manufactured by injection molding of transparent acrylate resin and a stick-shaped light source bar 113 arranged on both of the lateral side of the light guiding plate 112, and a light source cover 115 formed by a bracket-shaped (a shape of "[" or "]") metal plate from a lateral side view is attached to the front light 110 from the side of the light source bar 113. Namely, the light source cover 115 accommodates the light source bar 113, as well as keeps the light guiding plate 112 and the light source bar 113 into contact with each other and supports the both at a predetermined position, while pinching the light guiding plate 112 by its upper and lower surfaces of the end portion on the side of the light source bar between the inner surfaces of the end portion of the light source cover 115 on the opening side. Further, a reflective film (not illustrated) formed by a silver thin film is provided in the inner surface of the light source cover 115, for returning the light outgoing to the inner surface of the light source cover 115, to a light guiding body 113a, without entering the light guiding plate 112 and making a use of it. The bottom surface of the light guiding plate 112 (on the side of the liquid crystal unit 120) is regarded as the emissive surface to emit a light and the surface on the opposite side to the emissive surface (the top surface of the light guiding plate 112) is regarded as a prism surface 112c with the wedged grooves 114 periodically arranged alternatively for changing the direction of the light going through the light guiding plate 112.

The light source bar 113 comprises a bar-shaped light guiding body 113a and light emitting diodes (LED) 113b arranged in the both end portions thereof as light emitting elements, and a light emitted from the LED 113b is guided to the lateral end surface of the light guiding plate 112 by the light guiding body 113a and introduced into the light guiding plate 112.

The liquid crystal display unit 120 is a reflective liquid crystal display unit, in which a built-in or external reflective plate reflects a light coming from the front light 110 to perform a display. The liquid crystal display 100 of the above structure reflects the outside light and performs the ordinary reflective display under a circumstance where enough outside light is obtained, and in a dark place where it is impossible to get outside light, the front light 110 is used as the light source and this light is reflected so as to perform a display.

The liquid crystal display 100 of the above structure, however, may cause the phenomenon of partially deteriorating the brightness of the front light 110 in the case of performing an acceleration test of periodically repeating the cooling and the heating. When the present inventor examines this problem, it is found that the deterioration of the brightness is caused by the positional deviation of the light guiding plate 112 and the light guiding body 113a.

Figure 11:
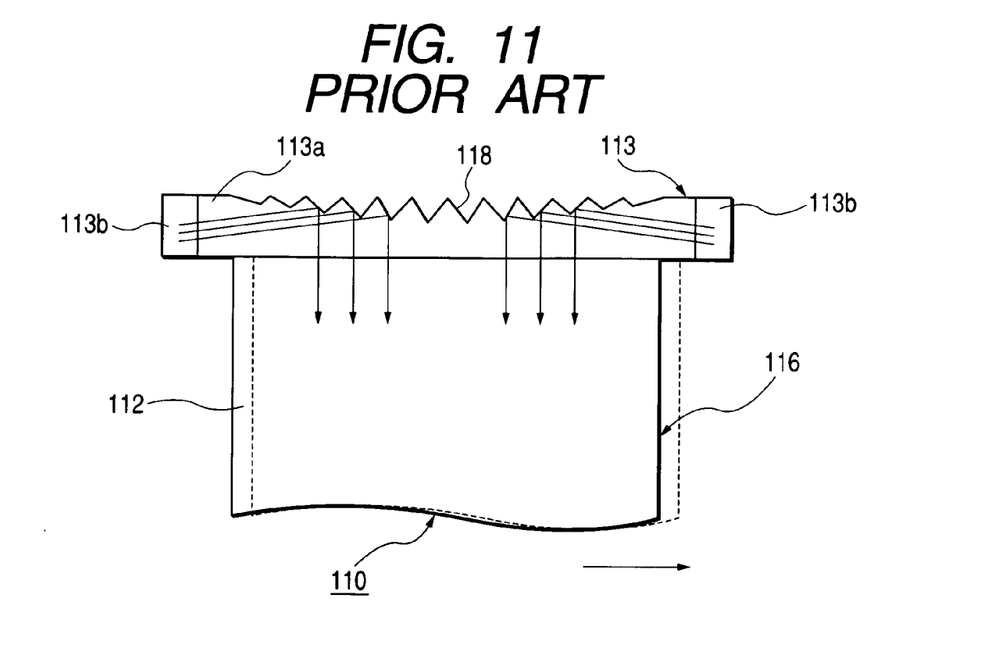
FIG. 11 is a partial plane view showing a light path of the front light shown in FIG. 10.

FIG. 11 is a plane view showing a light path of the front light 110 shown in FIG. 10. As illustrated in FIG. 11, in the light guiding body 113a of the light source bar 113, the surface opposite to the light guiding plate 112 is formed into a prism surface 118, and an incident light from the LED 113b to the light guiding body 113a is reflected by this prism surface 118 and emitted to the light guiding plate 112. In the front light 110 of this structure, since the propagation direction of the light reflected by the prism surface 118 is restricted to the narrow range, it is necessary to strictly adjust the position of the light guiding plate 112 relating to the light guiding body 113a of the light source bar 113, in order to introduce the light into the light guiding plate 112 uniformly, and especially, it is necessary to strictly position the light guiding plate 112 in the width direction. For example, as illustrated in a dotted line in FIG. 11, when the position of the light guiding plate 112 is deviated to the rightward direction in this drawing as shown by the arrow, the light amount of the right end portion 116 of the light guiding plate 112 is partially decreased and the emissive light amount easily becomes uneven within the surface, and the visibility of the liquid crystal display will be decreased partially.

As mentioned above, in the liquid crystal display 100, since the light source bar 113 and the light guiding plate 112 are fixed by attaching the light source cover 115 of the bracket shape in a laterally view, to the lateral end portion of the light source bar 113, the light guiding plate 112 is pinched by the inner surfaces of the light source cover 115. In this structure, since the light guiding plate 112 is pinched by the inner wide surface of the light source cover 115, expansion and constriction of the reflective film provided on the inner surface of the light source cover 115 effects the inner wide surface of the light source cover 115 and often deviates the position of the light guiding plate 112.

Accordingly, an object of the invention is to provide a surface emitting device of high reliability capable of positioning the light source bar and the light guiding plate accurately and improving the light source cover so as to keep the position thereof.

Another object of the invention is to provide a liquid crystal display of high reliability capable of keeping the accurate position of the liquid crystal display element and the surface emitting device using the improved light source cover.

SUMMARY OF THE INVENTION

In order to achieve the above objects, the present invention adopts the following structure.

The surface emitting device of the invention comprises a bar-shaped light source, a light guiding plate for entering a light of the light source from a lateral end surface and emitting the light from an emissive surface, and a cover for supporting the bar-shaped light source and the light guiding plate, wherein the cover is made of a metal plate having spring characteristic, a substantially bracket-shaped cross sectional shape, the width of the bracket-shaped cover on a side of an opening portion is smaller than the width on the opposite side, and the cover covers the bar-shaped light source and the light guiding plate and pinches the light guiding plate by the opening portion of the bracket-shaped cover, so as to make the bar-shaped light source and the light guiding plate into close contact and support the both.

This structure makes it possible to support the light guiding plate fixedly owing to a strong spring force of the cover, and keep the contact ability between the light guiding plate and the light source bar, so as to make it difficult for the both to depart from each other, thereby realizing the surface emitting device superior in reliability.

In the surface emitting device of the invention, a protrudent portion is provided on the upper inner surface of the bracket-shaped cover at a position corresponding to the top of the bar-shaped light source, so as to pinch the bar-shaped light source, and the opening portion of the bracket-shaped cover pinches the light guiding plate, thereby making the bar-shaped light source and the light guiding plate into close contact and supporting the both.

According to this structure, since both of the light source bar and the light guiding plate can be fixedly pinched by a strong spring force of the cover, the contact ability can be kept between the light guiding plate and the light source bar so as to make it difficult for the both to depart from each other, thereby realizing the surface emitting device superior in more reliability.

In the surface emitting device of the invention, it is preferable that the width of the distal end portion of the opening portion of the bracket-shaped cover is made larger than the narrowest width of the cover.

This is why it becomes easy to insert the light source bar and the light guiding plate into the cover, in assembling the cover, the light source bar, and the light guiding plate into the surface emitting device.

In the surface emitting device of the invention, a reflective film for reflecting a light from the light source may be provided in the inner surface of the metal plate which forms the cover, having the spring characteristic.

This is why it can induce the light from the light source to the light guiding plate efficiently.

Alternatively, the metal plate which forms the cover, having the spring characteristic, may be made of stainless steel with mirror finished surface by electrolytic polishing.

This is advantageous in eliminating faults including difference of thermal expansion and detachment, because the metal plate has no attached film but it is the reflective material itself.

Further, the metal plate which forms the cover, having the spring characteristic, may be made of low alloy steel that is chrome-plated.

Since the cost of the material is low, the cost reduction can be expected.

In the surface emitting device of the invention, it is preferable that projections for pinching the lateral end portion of the light guiding plate therebetween in the width direction are provided on the both ends of the cover and that by these projections, the light guiding plate is positioned in the width direction.

More specifically, protrudent portions protruding in the width direction of the light guiding plate are formed in the both ends of the cover, projections are extended respectively from the protrudent portions in the longitudinal direction of the light guiding plate or in the direction orthogonal to the longitudinal direction of the respective protrudent portions, and a space between the both projections is substantially identical to the width of the light guiding plate.

Further, the projections may be served as fit portions for fixing the surface emitting device to a case.

More specifically, each of the projections can be formed by a base extended from each end of the cover in a thickness direction of the light guiding plate, a fit plate extended from a distal end of the base in the longitudinal direction of the light guiding plate, a hook portion extended from an outward side of the fit plate and bent upwardly at a connected portion with the fit plate, and a hooked projection bent upward from a distal end portion of the fit plate.

Thus, by providing with the supporting structure of the light guiding plate by the cover of the light source and the positioning structure of the light guiding plate by the projections extended in the both end portions of the light source bar, it is possible to prevent positional deviation of the light guiding plate and the light source bar, caused by the expansion and contraction of the light guiding plate, the light source bar, and the cover by heating and cooling, and convey the light of the light source bar to the light guiding plate assuredly without loss. Therefore, the luminescence of the LED can be efficiently used for the light guiding plate, thereby obtaining the surface emitting device with more reliability.

In the surface emitting device of the invention, since the projections are constructed to serve as the fit portions for fixing the surface emitting device to the case, it is possible to fix the surface emitting device at an accurate position when installing it to the electro equipment, and enhance the working, efficiency at a manufacturing time. Further, since the surface emitting device of the invention can position the light source and the light guiding plate by using the projections accurately as mentioned above and makes it difficult for the both to depart from each other, it is possible to position the light guiding plate as well as, for example, the display arranged on the rear side of this light guiding plate accurately, by fixing the cover to the case assuredly by the fit portions.

The liquid crystal display of the invention has one of the surface emitting devices described in the above in front of a liquid crystal display element.

Namely, by providing the liquid crystal display with the surface emitting device of the invention having the above-mentioned superior reliability, it is possible to realize the liquid crystal display which can achieve a fine visibility for a long time, free from a fear of reducing the brightness caused by the heating and cooling.

DETAILED DESCRIPTION OF THE INVENTION

Although preferred embodiments of the invention will be, hereinafter, described with reference to the drawings, the invention is not restricted to the following forms of the embodiments.

(Surface emitting device)

[First Embodiment]

Figure 1:
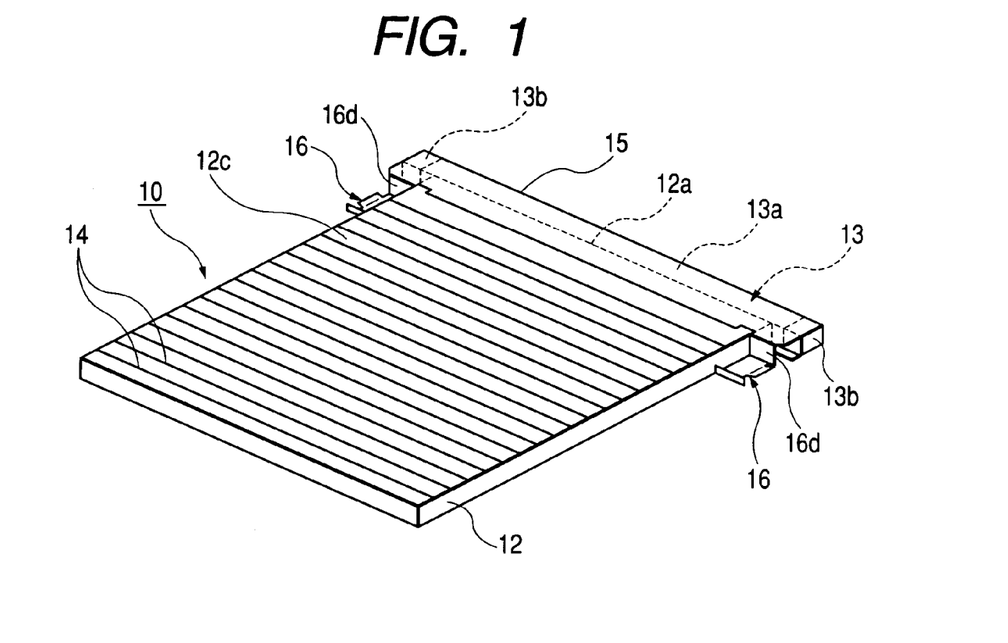
FIG. 1 is a perspective view showing one embodiment of a front light of the invention.
Figure 2:
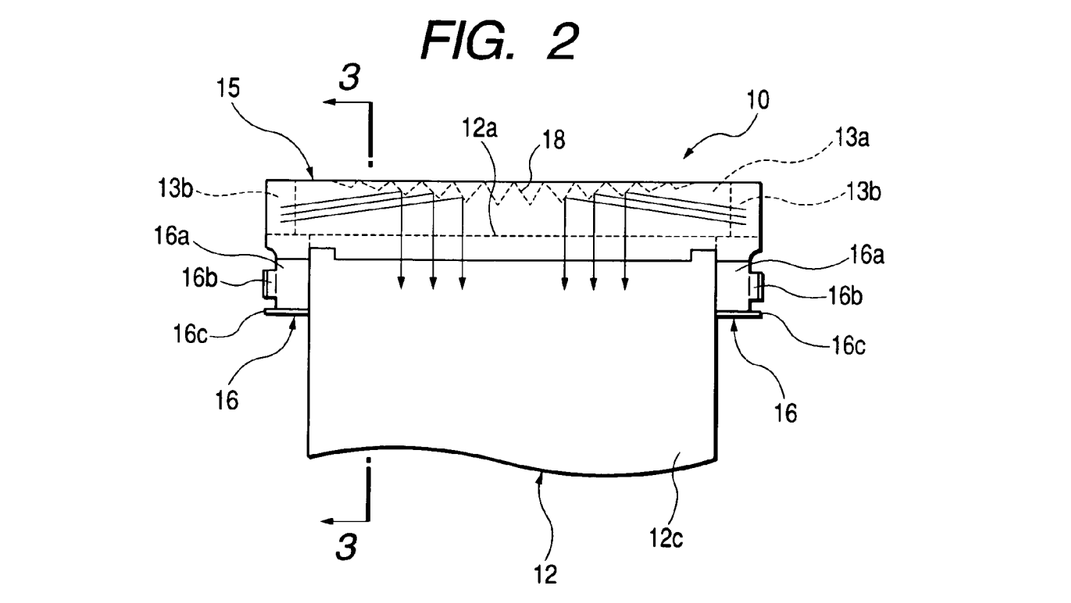
FIG. 2 is a partial plane view showing a light path of the front light shown in FIG. 1.

FIG. 1 is a perspective view of a front light (surface emitting device) according to an embodiment of the invention, and FIG. 2 is a partial plane view of the front light shown in FIG. 1. The front light 10 shown in these drawings comprises a flat light guiding plate 12 made of transparent resin material and a stick-shaped light source bar 13 provided in one end (one end portion of the short sides of the rectangular light guiding plate 12) of the lateral end portions of the light guiding plate 12. Further, a light source cover 15 having a substantially bracket-shaped cross sectional surface is attached to the front light from the side of the light source bar 13, and the distal end portion of the light source cover 15 pinches the upper and lower surfaces of the light guiding plate 12, hence to fix the light guiding plate 12 and the light source bar 13.

The light guiding plate 12 is a transparent flat plate material, the lateral end surface 12a opposite to the light source bar 13 is set as an incoming surface, and the light introduced to the inside from the lateral end surface 12a is reflected by a reflective surface 12c with the wedge grooves 14 substantially in parallel to the lateral end surface 12a intermittently formed in a stripe shape, hence to emit the light from the surface opposite to the reflective surface 12c (the bottom surface of FIG. 1). The light guiding plate 12 can be manufactured to be flat by injection molding or the like of the resin material such as transparent acrylate resin. As the material of forming the light guiding plate 12, the transparent resin such as polycarbonate resin and epoxy resin, besides the acrylate resin, and glasses can be used.

As illustrated in FIG. 2, the light source bar 13 comprises a square pole-shaped light guiding portion 13a made of acrylate resin and polycarbonate resin and light emitting elements 13b and 13b made of light emitting diodes (LED) provided on the both ends of the light guiding portion 13a in the longitudinal direction. On the surface opposite to the light guiding plate 12, of the side surfaces of the light guiding portion 13a, there is a prism surface 18 with a prism formed, and by reflecting the light introduced into the light guiding portion 13a from the light emitting elements 13b and 13b on this surface, the propagation direction of the light is changed toward the light guiding plate 12 and the lights emitted from the light emitting elements 13b and 13b are illuminated on the lateral end surface of the light guiding plate 12.

Although the structure having the light emitting element 13b formed by the LED is used for the light source bar 13 in this embodiment, a cold cathode tube or an organic EL element may be used for the light emitting element, and any element can be used preferably as far as it can illuminate the lateral end surface 12a of the light guiding plate 12 uniformly.

The light source cover 15 is attached to the front light from the side of the light source bar 13 in order to support and fix the light source bar 13 and the light guiding plate 12, and the light source cover 15 can be made by processing a metal plate superior in the spring characteristic, including, for example, low alloy steel, stainless steel, phosphor bronze, beryllium copper, and the like. Of these metals, a metal whose light reflectance rate is high is preferable, and stainless steel processed by the photoluminescent electrolytic polishing, and low alloy steel and copper alloy coated with a thin film of silver or aluminum or plated with chrome are preferably used.

In the embodiment, the light source cover 15 is shaped into the substantially bracket-shaped from a view of the lateral side and the width of the bracket-shaped opening portion is narrowed so as to strengthen the spring force in the case of pinching the light guiding plate. Further, lateral plates for covering the light emitting elements 13b and 13b may be provided on the both lateral ends of the light source cover 15.

Figure 3:
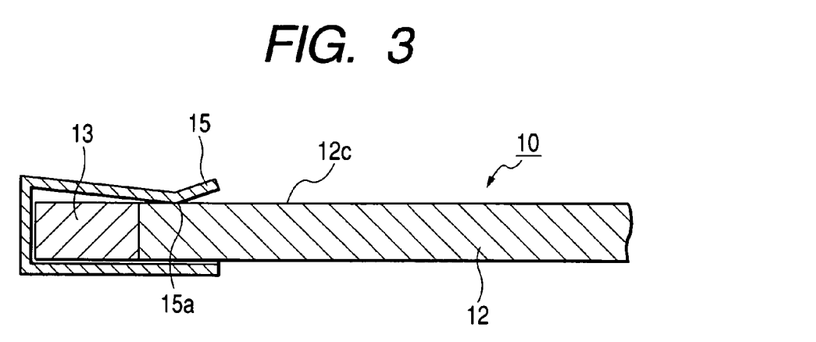
FIG. 3 is a cross sectional view taken on line 3—3 of the front light shown in FIG. 2.

FIG. 3 is a partially cross sectional view taken on line 3—3 of the front light 10 shown in FIG. 2. As illustrated in FIG. 2 and FIG. 3, the cross sectional shape of the light source cover 15 of this embodiment is the substantially bracket-shaped, the bracket-shaped opening portion is narrowed, and the cover 15 pushes and fixes the top surface (reflective surface 12c) of the light guiding plate 12 by the tangent 15a at the narrowest portion of the opening portion.

In the front light 10 of this embodiment, the light source cover 15 attached from the side of the light source bar 13 is supported by the tangent 15a on the top surface of the light guiding plate 12, while on the bottom surface of the light guiding plate 12, it is supported by the lower inner surface of the light source cover 15. Thanks to this structure, since the light guiding plate can be fixedly held by the spring force of the light source cover, it is possible to maintain the contact ability between the light guiding plate and the light source bar.

Further, a stress caused by the expansion and constriction of the light source cover is not easily applied to a wide surface of the light guiding plate 12, thereby realizing the front light 10 capable of reducing the possibility of deviation from the position of the light guiding plate 12 and the light source bar 13. Further, when the light reflex rate of the inner surface of the light source cover 15 is set high, the efficiency of using light can be enhanced by reflecting the light incident to the inner surface of the light source cover 15 on this reflective surface.

Figure 4:
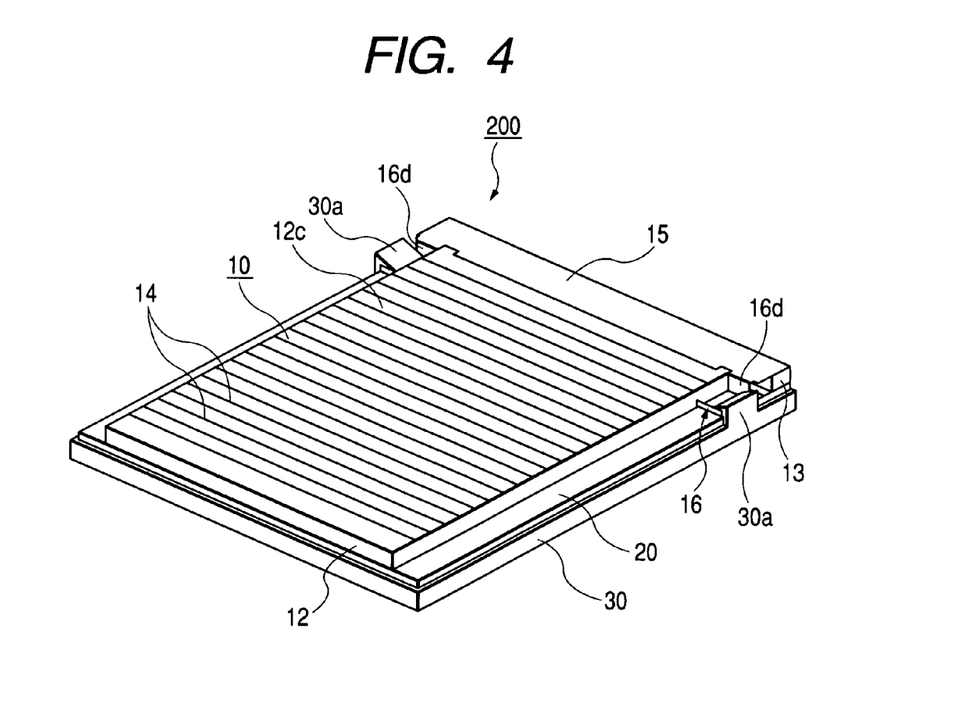
FIG. 4 is a perspective view showing one example of a liquid crystal display having the front light according to the invention.

FIG. 4 is a perspective view showing the liquid crystal display 200 in which the front light 10 of the above embodiment is placed in front of a liquid crystal display unit 20 and the both are supported by a case 30.

In the liquid crystal display 200 of this embodiment, the liquid crystal display unit 20 is included in the box-shaped case 30 and the front light 10 is placed in front of the liquid crystal display unit 20 (top surface) A hook member 30a provided in the case 30 is engaged in a projection 16 of the cover 15 so as to integrate the front light 10, the liquid crystal display unit 20, and the case 30.

Figure 5:
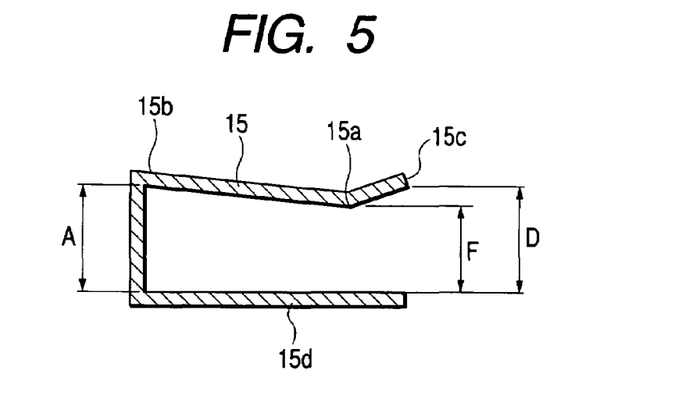
FIG. 5 is a cross sectional view showing one embodiment of a cover used for the front light according to the invention.

FIG. 5 is a view for use in describing the measurement relationship of the cross section of the light source cover 15 in the first embodiment. As illustrated, the light source cover 15 in the first embodiment has the cross section of the substantially bracket-shaped (a shape of "[" in FIG. 5), and the narrowest width F at the tangent 15a is measured to the bottom portion 15d from the tangent 15a and is on the side of the opening portion of the shape of "[" is smaller than the width A of the deepest portion of the shape of "[". Namely, in FIG. 5, F<A. Since the light source cover 15 is made of a metal superior in the spring characteristic, the strongest spring force is generated in the portion of the tangent 15a, which can press the light guiding plate powerfully and pinch it fixedly.

The width D of the distal end portion 15c of the opening portion in the bracket-shape light source cover 15 is set slightly larger than the width F of the tangent 15a portion. Namely, in FIG. 5, F<D.

In assembling the surface emitting device, this makes it easy to insert the light source bar 13 and the light guiding plate 12 into the light source cover 15.

Figure 6:
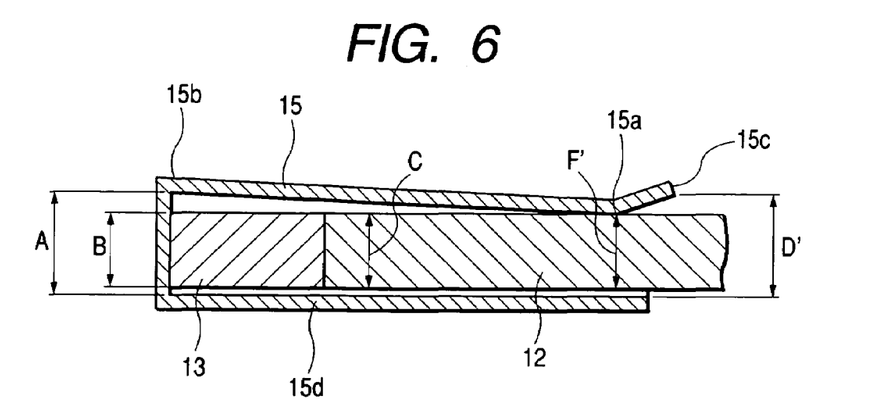
FIG. 6 is a cross sectional view for use in describing a state in which the cover shown in FIG. 5 is embedded in the front light.

FIG. 6 is a view for use in describing the measurement relationship in the case of inserting the light source bar 13 and the light guiding plate 12 into the light source cover 15 of the first embodiment. As illustrated in FIG. 6, the width A of the deepest portion 15b of the light source cover 15 measured from the bottom portion 15d is a little larger than each thickness B of the light guiding plate 12 and the light source bar 13. Namely, in FIG. 6, B<A.

The width F of the tangent 15a portion of the light source cover 15 is a little smaller than each thickness B (=C) of the light guiding plate 12 and the light source bar 13. Namely, in FIG. 5 and FIG. 6, F<B (=C). Accordingly, in the portion of the tangent 15a, the spring force of the light source cover 15 makes it possible to pinch the light guiding plate 12 and support it powerfully. In the case of inserting the light guiding plate 12 and the light source bar 13 into the light source cover 15, the width F' of the tangent 15a portion becomes each thickness B of the light guiding plate 12 and the light source bar 13, hence to generate a spring force. Namely, in FIG. 6, F<F'=B (=C).

Figure 7:
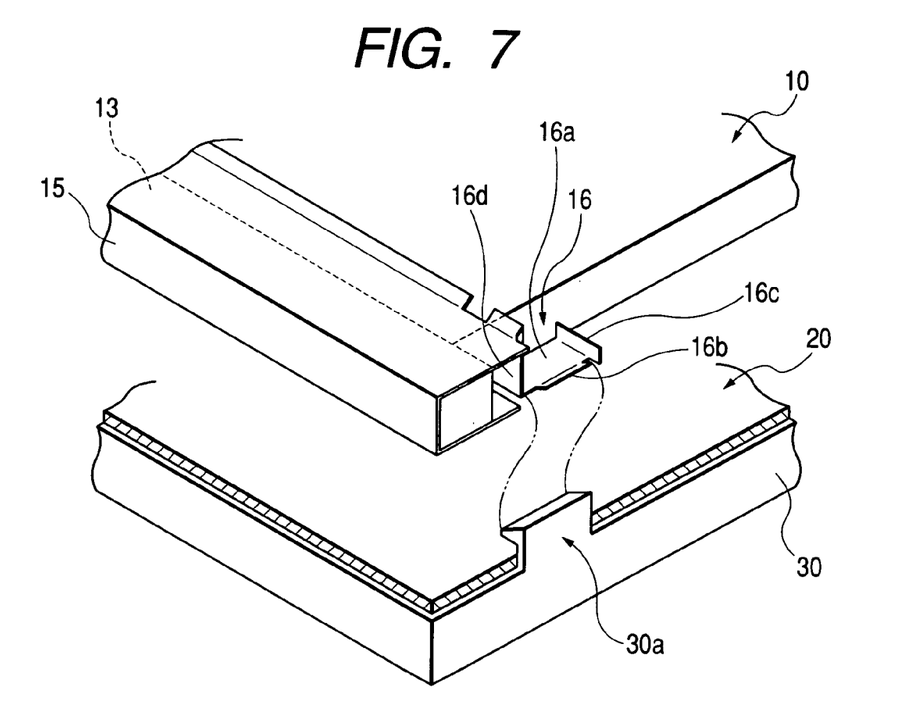
FIG. 7 is an enlarged perspective view showing the engaged portion of the case of the liquid crystal display and the front light shown in FIG. 4.

FIG. 7 is an enlarged perspective view showing the engaged portion of the case 30 and the front light 10 of the liquid crystal display shown in FIG. 4.

As illustrated in FIG. 1, the projections 16 and 16 are extended and formed in the both upper end portions of the light source cover 15 in the thickness direction of the light guiding plate 12 (only one piece is illustrated in FIG. 7). Each of the projections 16 and 16 has a base portion 16d extended from each end of the upper surface of the light source cover 15 along the thickness direction of the light guiding plate 12 and a fit plate 16a extended from the distal end of the base portion 16d in the longitudinal direction of the light guiding plate 12, and the distance between the two projections 16 and 16 is substantially identical to the width of the light guiding plate 12. In short, in the front light 10 of this embodiment, the light guiding plate 12 is inserted into the space between the projections 16 and 16 of the light source cover 15, hence to be positioned and fixed in the direction of the width. Accordingly, even if a stress for moving the light guiding plate 12 in the width direction should operate on the light guiding plate 12, since the movement of the light guiding plate 12 in the width direction is restricted by the projections 16 and 16, the positional deviation of the light guiding plate 12 rarely occurs.

It is preferable that the space between the projection 16 and the light guiding plate 12 is 0.1 mm and less. When the space between the projection 16 and the light guiding plate 12 is beyond 0.1 mm, the positional deviation of the light guiding portion 13a of the light source bar 13 and the light guiding plate 12 exceeds 0.1 mm and the brightness on the emissive surface of the light guiding plate 12 is partially reduced and the uniformity of the brightness is deteriorated disadvantageously.

Further, when the projection 16 is formed by the base portion 16d extended in the thickness direction of the light guiding plate 12, the fit plate 16a extended from the base portion 16d and formed in parallel to the light guiding plate 12, a hook portion 16b protruded outward from the fit plate 16a and a little bent upwardly in its basement (in the direction vertical against the fit plate 16a), and a hooked projection 16c extended from the distal end of the fit plate 16a and bent upwardly in its basement (in the vertical direction of the fit plate 16a). The projection 16 is provided in order to fix the front light 10, in front of the display or to the electronic equipment. By adopting the above structure, the positioning of the front light 10 when fixing it and its installation becomes easy and the positional deviation of the front light 10 can be prevented.

As illustrated in FIG. 7, in the liquid crystal display of the embodiment, a hook member 30a provided in the case 30 is engaged in the hook portion 16b of the projection 16, thereby fixing the front light 10. The width of the hook member 30a is designed to substantially agree with the length of the fit plate 16a of the projection 16 (the length from the distal end of the base portion 16d to the basement of the hooked projection 16c). Thus, the hook member 30a engaged in the projection 16 is in a state of almost abutting on the base portion 16d and the hooked projection 16c provided on the lateral sides thereof. Accordingly, the movement of the light guiding plate 12 of the front light 10 fixed to the case 30 in the longitudinal direction is restricted by the hook member 30a pinched by the base portion 16d and the hooked projection 16c, which restrains from the positional deviation of the front light 10 and the liquid crystal display 20. According to this structure, it is possible to position the front light 10 accurately in the case 30 and keep its position. Further, according to the above structure, when fixing the front light 10 to the case 30, the hook member 30a has only to be engaged in the projection 16, and therefore, the liquid crystal display can be formed very simply.

[Second Embodiment]

(Surface Emitting Device)

Figure 8:
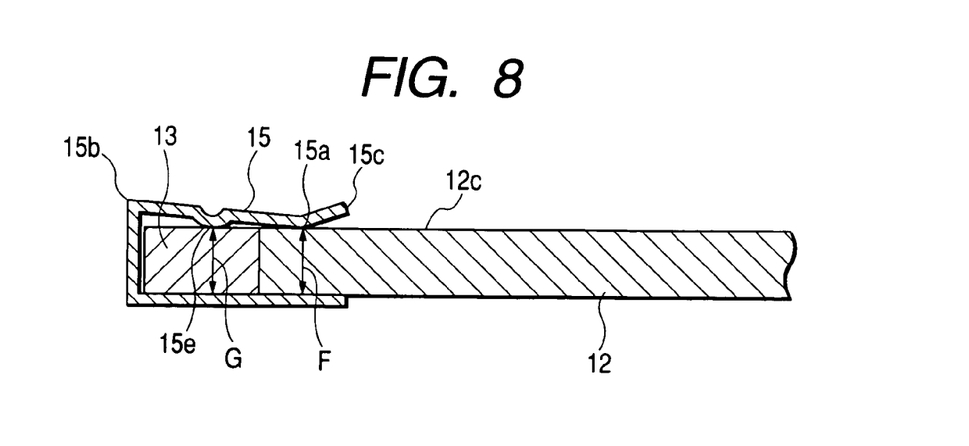
FIG. 8 is a cross sectional view showing another embodiment of a cover used in the front light according to the invention.

Next, FIG. 8 shows a cross sectional view of a cover for use in a surface emitting device according to another embodiment of the invention. The cover of this embodiment is different from the cover of the first embodiment shown in FIGS. 5 and 6 in that a protrudent portion 15e is provided on the upper inner surface of the bracket-shaped cover 15 at the position corresponding to the top of the light source bar 13, the light source bar 13 is pinched by the protrudent portion 15e, and that the light guiding plate 12 is pinched by the tangent 15a on the side of the opening of the bracket-shaped cover 15, in a more assured way of contacting and supporting the light guiding plate 12 and the light source bar 13.

Figure 9:
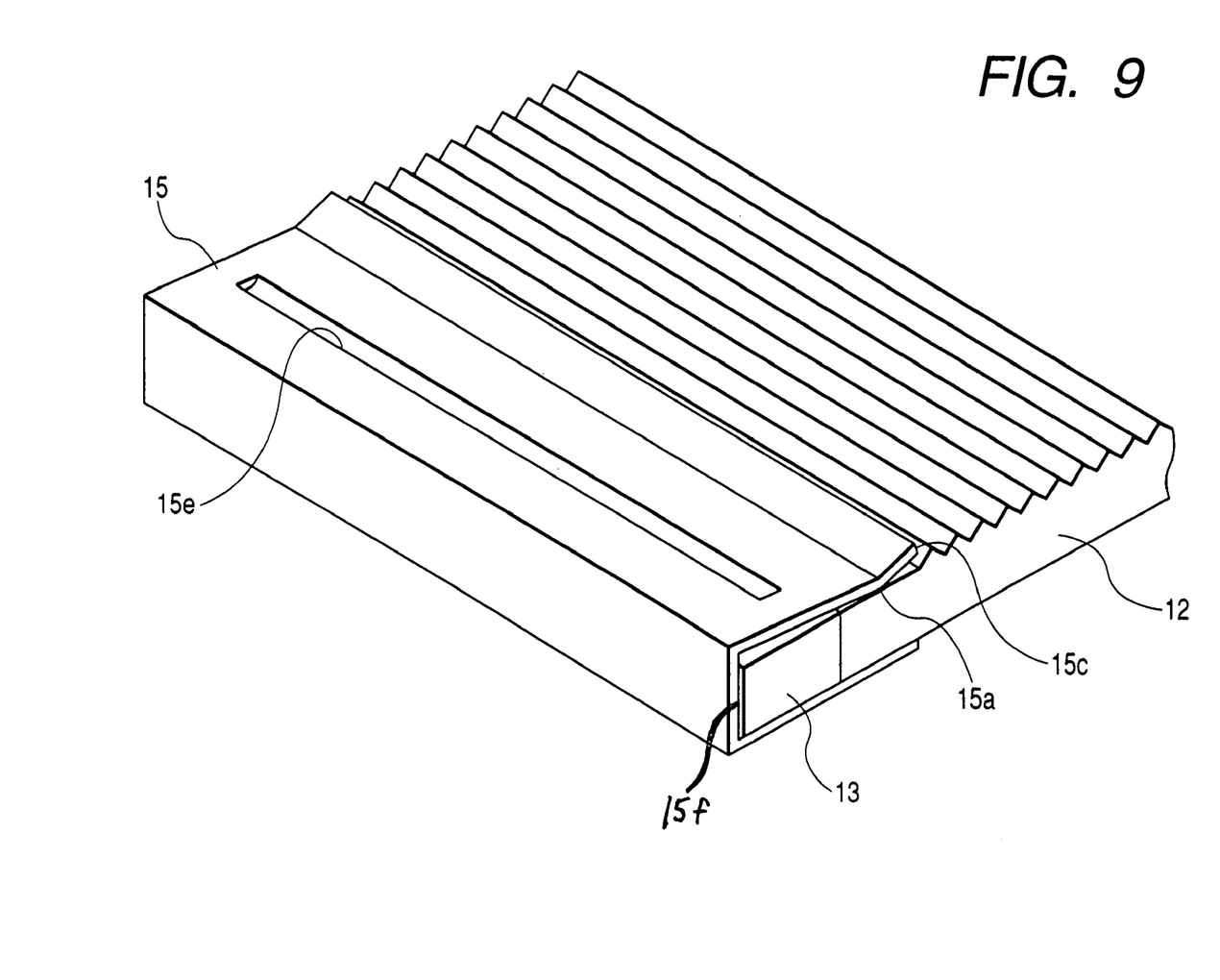
FIG. 9 is a perspective view for use in describing a state in which the cover shown in FIG. 8 is embedded in the front light.

FIG. 9 is a perspective appearance view showing the state of assembling the surface emitting device by use of the cover 15 shown in FIG. 8 in order to pinch the light guiding plate 12 and the light source bar 13. The light guiding plate 12 and the light source bar 13 are respectively pinched by the tangent 15a and the protrudent portion 15e of the cover 15. The protrudent portion 15e looks like a hollow outwardly.

In thus structure, both of the light source bar and the light guiding plate can be firmly supported by a strong spring force of the cover and the contact ability of the light guiding plate and the light source bar can be kept so as to make it difficult for the both to depart from each other, thereby realizing the surface emitting device superior in reliability.

(Liquid Crystal Display)

A liquid crystal display according to the second embodiment adopts the surface emitting device in which the design of the cover is changed as mentioned above, and since the method of assembling the surface emitting device and the liquid crystal display panel is the same as in the case of the first embodiment, the description thereof is omitted.

As set forth hereinabove, the surface emitting device of the invention comprises the bar-shaped light source, the light guiding plate for entering a light of the light source from the lateral end surface and emitting the light from the emissive surface, and the cover for supporting the bar-shaped light source and the light guiding plate, wherein the cover is made of a metal plate having the spring characteristic, a substantially bracket-shaped cross sectional shape. Further, in the surface emitting device, the width of the bracket-shaped cover on the side of an opening portion is smaller than the width on the unopened opposite side, and the cover covers the bar-shaped light source and the light guiding plate and pinches the light guiding plate by the opening portion of the bracket-shaped cover, so as to make the bar-shaped light source and the light guiding plate into close contact and support the both.

This structure makes it possible to support the light guiding plate fixedly owing to a strong spring force of the cover, and keep the contact ability between the light guiding plate and the light source bar, so as to make it difficult for the both to depart from each other, thereby realizing the surface emitting device superior in reliability.

In the surface emitting device of the invention, a protrudent portion is provided on the upper inner surface of the bracket-shaped cover at a position corresponding to the top of the bar-shaped light source, so as to pinch the bar-shaped light source at the prudent portion, and the opening portion of the bracket-shaped cover pinches the light guiding plate, thereby making the bar-shaped light source and the light guiding plate into close contact and supporting the both.

According to this structure, since both of the light source bar and the light guiding plate can be fixedly pinched by a strong spring force of the cover, the contact ability can be kept between the light guiding plate and the light source bar so as to make it difficult for the both to depart from each other, thereby realizing the surface emitting device superior in more reliability.

In the surface emitting device of the invention, a reflective film 15f or something for reflecting a light from the light source can be provided in the inner surface of the metal plate which forms the cover, having the spring characteristic. Alternatively, the metal plate can be made of stainless steel with mirror finished surface by electrolytic polishing. Furthermore, the metal plate can be made of low alloy steel chromeplated.

By properly selecting the material of the cover, it is possible to introduce the light from the light source efficiently to the light guiding plate and obtain the surface emitting device of good performance at a low cost.

Further, in the surface emitting device of the invention, since the projections are provided on the both ends of the cover so as to pinch the light guiding plate, it is possible to prevent the positional deviation between the light guiding plate and the light source bar in the width direction of the light guiding plate and keep the contact ability of the light source bar and the light guiding plate, thereby obtaining the surface emitting device of high reliability.

The liquid crystal display of the invention comprises the surface emitting device having the projections in the cover, the liquid crystal display element positioned on the side of the emissive surface of the surface emitting device, and the case for supporting the surface emitting device and the liquid crystal element, wherein the hook members provided in the case are engaged in the projections of the cover of the surface emitting device, so as to integrate the surface emitting device, the liquid crystal element, and the case. Therefore, the surface emitting device can be fixed to the case through the fit portions (projections) easily and accurately.

Especially, when the length of the fit plate of the projection is substantially identical to the width of the hook member, it is possible to reduce the possibility of generating the positional deviation of the surface emitting device from the case to a high degree, thereby realizing the liquid crystal display superior in reliability.

What is claimed is:

1. A surface emitting device having a bar-shaped light source, a light guiding plate for entering a light of the light source from a lateral end surface and emitting the light from an emissive surface, and a cover for supporting the bar-shaped light source and the light guiding plate, wherein the cover is made of a metal plate having a spring characteristic, a substantially bracket-shaped cross sectional shape, a width of the bracket-shaped cover tapers toward an opening portion, and the cover covers the bar-shaped light source and the light guiding plate and pinches the light guiding plate by the opening portion of the bracket-shaped cover, so as to make the bar-shaped light source and the light guiding plate into close contact and support the bar-shaped light source and the light guide plate, wherein a protrudent portion is provided on an upper inner surface of the bracket-shaped cover at a position corresponding to a top of the bar-shaped light source, so as to pinch the bar-shaped light source, and the opening portion of the bracket-shaped cover pinches the light guiding plate, thereby making the bar-shaped light source and the light guiding plate into close contact and supporting the bar-shaped light source and the light guide plate.

2. The surface emitting device, according to claim 1, wherein a width of a distal end portion of the opening portion of the bracket-shaped cover is larger than a narrowest width of the cover.

3. The surface emitting device, according to claim 1, wherein a reflective film for reflecting a light from the light source is provided in an inner surface of the metal plate which forms the cover.

4. The surface emitting device, according to claim 1, wherein the metal plate which forms the cover is made of stainless steel with mirror finished surface by electrolytic polishing.

5. The surface emitting device, according to claim 1, wherein the metal plate which forms the cover is made of chrome plated low alloy steel.

6. The surface emitting device, according to claim 1, wherein projections for pinching the lateral end portion of the light guiding plate therebetween in the width direction are provided on the both ends of the cover, and the light guiding plate is positioned in the width direction by the projections.

7. The surface emitting device, according to claim 1, wherein protrudent portions protruding in the width direction of the light guiding plate are formed in the both ends of the cover, projections are extended respectively from the protrudent portions one of in a longitudinal direction of the light guiding plate and in a direction orthogonal to a longitudinal direction of the respective protrudent portions, and a space between the projections is substantially identical to the width of the light guiding plate.

8. The surface emitting device, according to claim 7, wherein the projections serve as fit portions for fixing the surface emitting device to a case.

9. The surface emitting device, according to claim 8, wherein each of the projections is formed by a base extended from each end of the cover in a thickness direction of the light guiding plate, a fit plate extended from a distal end of the base in the longitudinal direction of the light guiding plate, a hook portion extended from an outward side of the fit plate and bent upwardly at a connected portion with the fit plate, and a hooked projection bent upward from a distal end portion of the fit plate.

10. A liquid crystal display, in which the surface emitting device according to claim 1 is provided in front of a liquid crystal display element.

11. The surface emitting device, according to claim 1, wherein the bracket-shaped cover tapers from a distal end portion of the opening portion toward a portion of the cover in which the width is narrowest.

12. A surface emitting device having a bar-shaped light source, a light guiding plate for entering a light of the light source from a lateral end surface and emitting the light from an emissive surface, and a cover for supporting the bar-shaped light source and the light guiding plate, wherein the cover is made of a metal plate having a spring characteristic, the cover has a substantially bracket-shaped cross sectional shape in which a width of the bracket-shaped cover on a side of an opening portion is smaller than the width on the opposite side, a protrudent portion is provided on an upper inner surface of the bracket-shaped cover at a position corresponding to a top of the bar-shaped light source so as to pinch the bar-shaped light source, and the cover covers the bar-shaped light source and the light guiding plate and pinches the light guiding plate by the opening portion of the bracket-shaped cover.

13. The surface emitting device, according to claim 12, wherein a width of a distal end portion of the bracket-shaped cover is larger than a narrowest width of the cover.

14. The surface emitting device, according to claim 12, wherein a reflective film for reflecting a light from the light source is provided in an inner surface of the metal plate which forms the cover.

15. The surface emitting device, according to claim 12, wherein the metal plate which forms the cover is made of stainless steel with mirror finished surface by electrolytic polishing.

16. The surface emitting device, according to claim 12, wherein the metal plate which forms the cover is made of chrome plated low alloy steel.

17. The surface emitting device, according to claim 12, wherein projections for pinching the lateral end portion of the light guiding plate therebetween in the width direction are provided on the ends of the cover, and the light guiding plate is positioned in a width direction by the projections.

18. The surface emitting device, according to claim 12, wherein protrudent portions protruding in the width direction of the light guiding plate are formed in both ends of the cover, projections are extended respectively from the protrudent portions one of in a longitudinal direction of the light guiding plate and in a direction orthogonal to the longitudinal direction of the respective protrudent portions, and a space between the projections is substantially identical to the width of the light guiding plate.

19. The surface emitting device, according to claim 18, wherein the projections serve as fit portions for fixing the surface emitting device to a case.

20. The surface emitting device, according to claim 19, wherein each of the projections is formed by a base extended from each end of the cover in a thickness direction of the light guiding plate, a fit plate extended from a distal end of the base in a longitudinal direction of the light guiding plate, a hook portion extending from an outward side of the fit plate and bent upwardly at a connected portion with the fit plate, and a hooked projection bent upward from a distal end portion of the fit plate.

21. A liquid crystal display, in which the surface emitting device according to claim 12 is provided in front of a liquid crystal display element.

* * * * *